United States Patent [19]
Stoilov et al.

[11] 3,905,802
[45] Sept. 16, 1975

[54] SEPARATION OF SOLID METAL IMPURITIES FROM ZINC SULPHATE SOLUTIONS

[75] Inventors: Ivan Kostadinov Stoilov; Pencho Ivanov Ralchev; Georgi Nikolov Korudanov; Lyuben Rangelov Starev; Ivaylo Yanev Grigorov; Todor Vassilev Shikov; Kiril Spassov Kirev; Ivan Zahariev Zashev; Yovko Nikolov Yovkov, all of Plovdiv; Kostadin Dimitrov Apostolov, Village Krumova; Georgi Iliev Ivanov; Stoycho Ivanov Mutafchiev, both of Assenovgrad, all of Bulgaria

[73] Assignee: DSO "Metalurgia i Rudodobiv", Sofia, Bulgaria

[22] Filed: May 15, 1974

[21] Appl. No.: 470,298

[30] Foreign Application Priority Data
May 15, 1973 Bulgaria .............................. 23601

[52] U.S. Cl. .................... 75/120; 75/97; 75/115; 423/106; 210/67; 210/327; 204/119
[51] Int. Cl.² ........................................... C01G 9/06
[58] Field of Search .............. 75/97, 108, 120, 115; 423/106; 210/327, 67; 204/119

[56] References Cited
UNITED STATES PATENTS
| | | | |
|---|---|---|---|
| 2,599,816 | 6/1952 | Ellsworth | 75/120 X |
| 2,996,440 | 8/1961 | Forward et al. | 204/119 |
| 3,753,692 | 8/1973 | Bourchier et al. | 75/115 |

*Primary Examiner*—G. Ozaki

[57] ABSTRACT

Method for the continuous separation of the solid phase in the purification of zinc sulphate solutions. The solutions are filtered on chamber disc filters under an elevated pressure up to 4 atm. The precipitate is removed mechanically from the filtering elements by the action of a strong jet of zinc sulphate solution at a temperature of 40°–60°C. The recovery of the filtrability of the filter cloth of the chamber disc filter is achieved by washing it with hot water.

Chamber disc filter for carrying out the above method. The apparatus has a collector shaft with mounted collector tubes, filtering elements, clothed with a synthetic filtering cloth, a nozzle washing device, means for rotating the collector shaft and filtering elements, and a driven screw for collecting the separated solid phase, the pipe connecting the filtering elements with the collector shaft having section of above 13 mm.

3 Claims, 3 Drawing Figures

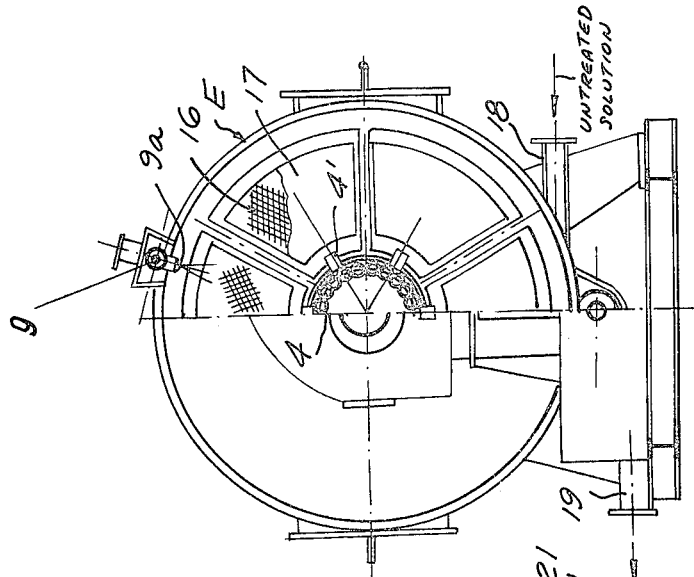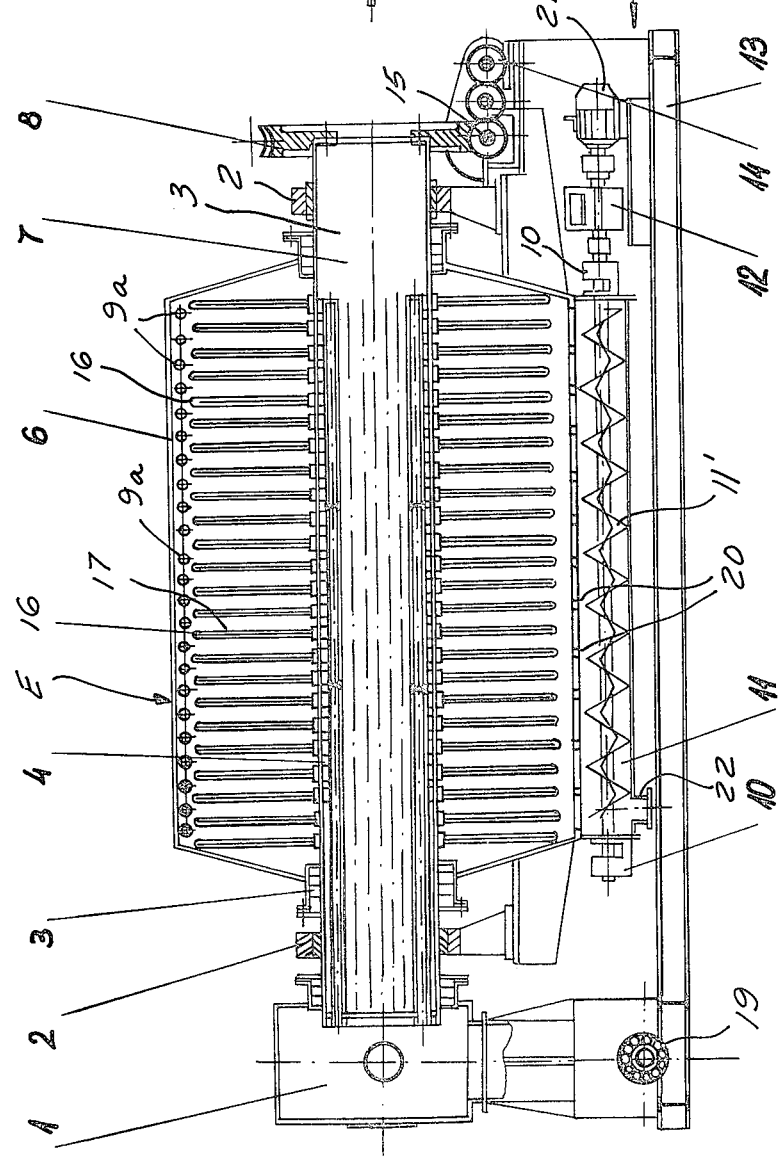

SEPARATION OF SOLID METAL IMPURITIES FROM ZINC SULPHATE SOLUTIONS

The present invention relates to a method of and an apparatus for the separation of the solid phase from zinc sulphate solutions in their purification from admixtures in the hydrometallurgical recovery of the zinc.

Several methods are known for the separation of the solid phase in the purification of the zinc sulphate solutions from admixtures, wherein the separation of the solid phase is carried out by batch processes employing filtration in filter presses. All these methods are currently used in all zinc hydrometallurgical works. Apart from the diversity of the constructions of the filter presses and their improvements, in zinc hydrometallurgy their use is connected with the following disadvantages:

The filter presses operate periodically, and at every 6 – 8 hours filtering must be stopped for the removal of the solid residue and the changing of the filtering material (cloth or paper).

The servicing of the filter presses entails hard manual labor; during such operation the workers are in immediate contact with the separated residue.

The solid residue after the cementation (hardening) of the copper and the cadmium with zinc dust is sintered, which requires it being ground before it is shipped.

The smallest folding of the filter cloth or unevenness of the packing surfaces of the plates and the frames causes leakages of the solution, which decreases the quality of the filtrate.

The object of the present invention is to create a method of and an apparatus for the separation of the solid phase, obviating the aforementioned disadvantages and insuring a continuous working process.

In the method according to the present invention for the separation of the solid phase from zinc sulphate solutions, the separation is carried out continuously by means of chamber disc filters, and the copper-cadmium and cobalt cakes obtained in the form of a fine grained precipitation are mechanically removed from the filtering elements. The mechanical removal of the cakes is carried out under the action of a jet of the zinc sulphate solution heated to 40°–60°C, and under a pressure of 4 to 6 atm.

In the accompanying drawings illustrating a preferred arrangement of apparatus in accordance with the invention:

FIG. 2 is a view in vertical axial section through a chamber disc filter in accordance with the present invention for continuously separating the solid phase from zinc sulphate solutions; and FIG. 3 is a view partially in end elevation and partially in transverse vertical section through the device of FIG. 2.

Figure 1:
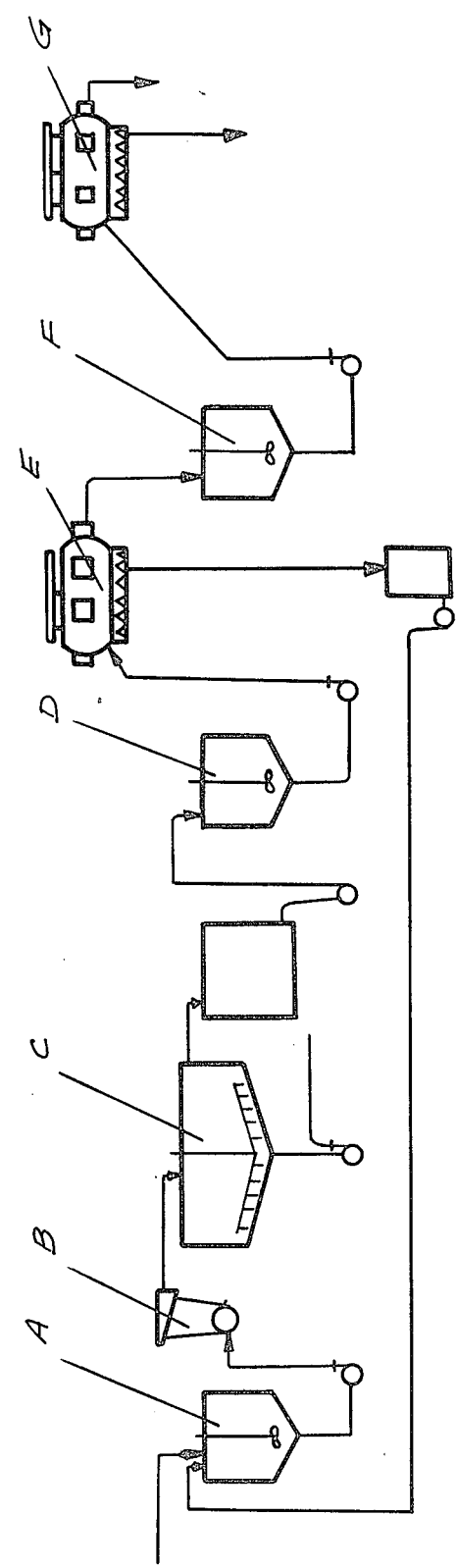
FIG. 1 is a schematic layout of a system which produces separated copper-cadmium and cobalt cakes, such system employing chamber disc filters.

The method of the invention is carried out in a system such as shown in FIG. 1. The initial uncleaned zinc sulphate solution, treated with zinc dust and reversible cake in a mixer A, after passing through a classifier B and a settler C is finally cleaned of cadmium in a mixer D, from which it is pumped into a chamber disc filter E. The solution enters a mixer F for the precipitation of the cobalt ions by means of potassium ethyl xanthogenate and copper sulphate, and thereafter is filtered in the chamber disc filter G. The separated copper-cadmium and cobalt cakes are sent for subsequent treatment which is not a part of this invention.

Since the devices E and G in FIG. 1 are of the same construction, only the device E is shown in FIGS. 2 and 3 and now described. Device E has a housing 6 which is of circular cylindrical configuration in the main extension thereof, the outer ends being of oppositely disposed frusto-conical shape. The housing 6 is fixedly mounted upon a fixed supporting frame 13, as shown. A hollow collector shaft 7 in the form of a centrally disposed horizontal conduit extends through the housing member 6 and outwardly of each of the ends thereof, shaft 7 being sealed to the central parts of the ends of the housing 6 by labyrinth packings 3. A plurality of collector tubes 4 which open at the left end (FIG. 2) and closed at the right end extend through the collector shaft 7 and are supported in substantially edgewise contact to form a tube-like formation which is spaced slightly inwardly from the inner wall of the collector shaft 7 as shown in FIG. 3.

Outwardly of the labyrinth packing there are axially sliding bearings 2 in which the collector tube 7 is journalled. The collector tube is rotatably driven to revolve about its axis by a motor (not shown) which drives through a speed reducer 14, a worm 15 driven thereby, and a worm gear 8 in mesh with worm 15. Affixed to the outer surface of the collector tube 7 are a plurality of uniformly axially spaced disc-like filtering elements 16 made up in the form of a plurality of segmental portions as shown in FIG. 3, each such portion being foraminous and being covered by a synthetic filtering cloth 17. The interiors of the filtering elements 16 communicate with the collector tubes 4 through tubes 4' (FIG. 3), eight filter elements being connected to one tube. In the illustrative embodiment eight filter elements are connected to each collector tube 4.

Solution from which cobalt cake is to be separated enters the housing 6 through an inlet conduit 18 at the lower right in FIG. 3 and passes radially inwardly through the filtering elements 16 and the filtering cloths 17. The liquid then passes inwardly through the tubes 4' affixed at suitable openings in the wall of the collector shaft 7 and thence travels through the collector tubes 4 in the direction from right to left in FIG. 2. Liquid issuing from the left-hand ends of the tubes 4 travels into a common collector 1 and thence outwardly of the device through the outlet conduit 19.

Solid matter speparated from the solution by the filtering elements and filtering cloths 16, 17 settles to the bottom of the housing 6 and passes through holes 20 in the bottom thereof into the housing of a spiral conveyor 11. The conveyor 11 has a screw 11' therein extending longitudinally thereof, the screw being journalled in bearings 10. The screw is driven by a motor 21 through a speed reducer 12. The screw of the spiral conveyor is driven in such direction as to forward the separated solid phase in a direction from right to left in FIG. 2, the solid matter being discharged from the conveyor through an outlet port 22.

The device is provided with a washing device 9 having a plurality of aligned nozzles 9a through which a jet of zinc sulphate solution under pressure can be introduced to wash the filtering cloths 17.

The method and the device according to the present invention have the following advantages:

The filtering of the solutions is carried out continuously.

The removal of the precipitation from the filtering elements is achieved fully automatically.

The content of the solid phase in the filtrate is very low.

The consumption of the filtering cloth is much lower in comparison with the filter presses.

There is no need of grinding the copper-cadmium cake in a ball-mill.

There is no need to wash the filtering cloths on washing machines or cloth-washings.

The present invention is illustrated by the following example:

EXAMPLE

After the cementation (hardening) of the copper and the cadmium or the precipitation of the cobalt, the zinc sulphate solution, with a content of the solid phase up to 20 g/l is sent to a continuous filtration in a chamber disc filter possessing the following characteristics: filtering surface 80 m$^2$; working pressure to 4 atm; volume of the filter chamber 7.5 m$^3$; and working (useful) volume 6 m$^3$. The output of the filter is up to 70 m$^3$/hour. The content of the cadmium ions after purification of the solution from the cobalt by the xanthogenate method is under 0.1 mg/l. The removal of the precipitate is achieved by a jet of the zinc sulphate solution under a pressure of 6 atm. The precipitate possesses a fine grained structure.

The purified and filtered solution is sent to be electrolized by the well-known methods for the recovery of zinc from it.

Although the invention is illustrated and described with reference to one embodiment thereof, it is to be understood that it is in no way limited to the disclosure of such a single preferred embodiment, but is capable of numerous modifications within the scope of the appended claims.

What is claimed is:

1. A method for the continuous separation of the solid phase in the purification of zinc sulphate solutions comprising filtering the solutions in chamber disc filters under an elevated pressure up to 4 atm.

2. A method according to claim 1, comprising removing the precipitate from the filtering elements mechanically by the action of a strong jet of zinc sulphate solution at a temperature of 40°–60°C.

3. A method according to claim 1, comprising recovering the filtrability of the filter cloth of the chamber disc filter by washing it with hot water.

* * * * *